United States Patent
Zhang et al.

(10) Patent No.: US 10,425,872 B2
(45) Date of Patent: *Sep. 24, 2019

(54) NETWORK SWITCHING METHOD, SYSTEM, AND NETWORK SIDE DEVICE

(71) Applicant: HUAWEI TECHNOLOGIES CO., LTD., Shenzhen, Guangdong (CN)

(72) Inventors: Shunqing Zhang, Shenzhen (CN); Yan Chen, Shanghai (CN); Ye Wu, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 15/484,520

(22) Filed: Apr. 11, 2017

(65) Prior Publication Data

US 2017/0223590 A1 Aug. 3, 2017

Related U.S. Application Data

(63) Continuation of application No. 14/587,134, filed on Dec. 31, 2014, now Pat. No. 9,661,541, which is a
(Continued)

(30) Foreign Application Priority Data

Jul. 4, 2012 (CN) .......................... 2012 1 0229729

(51) Int. Cl.
*H04W 4/00* (2018.01)
*H04W 36/14* (2009.01)
(Continued)

(52) U.S. Cl.
CPC ....... *H04W 36/14* (2013.01); *H04W 36/0066* (2013.01); *H04W 36/12* (2013.01);
(Continued)

(58) Field of Classification Search
USPC ....... 370/331, 352, 332, 237, 354, 356, 401, 370/329, 330, 349, 355, 522
See application file for complete search history.

(56) References Cited

U.S. PATENT DOCUMENTS 8,477,725 B2 * 7/2013 Shuai ................ H04W 36/0066
370/235
9,380,510 B2 * 6/2016 Kim ..................... H04W 36/385
(Continued)

FOREIGN PATENT DOCUMENTS

CN 1463128 A 12/2003
CN 101213866 A 7/2007
(Continued)

OTHER PUBLICATIONS

Xiuqiang Xu et al. On Functionality Separation for Green Mobile Networks: Concept Study over LTE, Heterogeneous and Small Cell Networks, IEEE Communications Magazine • May 2013. total 9 pages.
(Continued)

*Primary Examiner* — Phuongchau Ba Nguyen
(74) *Attorney, Agent, or Firm* — Leydig, Voit, Mayer, Ltd.

(57) ABSTRACT

Embodiments of the present invention apply to the technical field of communications, and disclosed are a network switching method, system, and network side device. In the embodiment of the invention, within coverage of network side devices on one signaling plane, when a current network side device bearing data plane information of a terminal device determines that handover from the current network side device to a target network side device is required, the current network side device performs handover confirmation with the target network side device, so that the target network side device enables a data plane information com-
(Continued)

munication function with the terminal device and completes switching the bearer of the data plane information.

4 Claims, 7 Drawing Sheets

Related U.S. Application Data continuation of application No. PCT/CN2013/070771, filed on Jan. 21, 2013.

(51) Int. Cl.
*H04W 36/00* (2009.01)
*H04W 72/04* (2009.01)
*H04W 36/12* (2009.01)
*H04W 36/38* (2009.01)
*H04W 76/22* (2018.01)
*H04W 88/16* (2009.01)

(52) U.S. Cl.
CPC ......... *H04W 36/38* (2013.01); *H04W 72/042* (2013.01); *H04W 36/0069* (2018.08); *H04W 76/22* (2018.02); *H04W 88/16* (2013.01)

(56) References Cited

U.S. PATENT DOCUMENTS

| | | | |
|---|---|---|---|
| 9,661,541 B2* | 5/2017 | Zhang | H04W 36/14 |
| 2007/0025294 A1 | 2/2007 | Kim et al. | |
| 2007/0254667 A1 | 11/2007 | Jokinen | |
| 2009/0241007 A1 | 9/2009 | Hong et al. | |
| 2010/0067483 A1* | 3/2010 | Ahluwalia | H04W 36/02 370/331 |
| 2010/0232391 A1* | 9/2010 | Olsson | H04W 36/02 370/331 |
| 2010/0297998 A1* | 11/2010 | Hapsari | H04W 36/0072 455/438 |
| 2011/0274085 A1 | 11/2011 | Geary et al. | |
| 2013/0165130 A1 | 6/2013 | Wu et al. | |
| 2014/0004863 A1* | 1/2014 | Zhang | H04W 36/0033 455/444 |
| 2015/0110075 A1 | 4/2015 | Zhang et al. | |
| 2015/0156754 A1 | 6/2015 | Xu et al. | |
| 2016/0081081 A1 | 3/2016 | Xu et al. | |

FOREIGN PATENT DOCUMENTS

| | | |
|---|---|---|
| CN | 101175329 A | 5/2008 |
| CN | 102348244 A | 2/2012 |
| CN | 102469557 A | 5/2012 |
| CN | 103533589 A | 1/2014 |
| CN | 103582024 A | 2/2014 |
| CN | 104113875 A | 10/2014 |
| CN | 104244426 A | 12/2014 |
| EP | 1367841 A2 | 12/2003 |
| EP | 2375815 A1 | 10/2011 |
| WO | 03105493 A2 | 12/2003 |
| WO | 2008097147 A1 | 8/2008 |
| WO | 2011137784 A1 | 11/2011 |

OTHER PUBLICATIONS

Shunqing Zhang et al. Function Separation design of green cellular network, China communications standards association. Apr. 9, 2014. total 24 pages. with English translation.
EP/13812564.6-1214, Office Action, dated Mar. 1, 2019.
U.S. Appl. No. 15/483,842, filed Apr. 10, 2017.
Capone et al., "Looking Beyond Green Cellular Networks," 2012 9th Annual Conference on Wireless On-Demand Networks Systems and Services(WONS), XP55557938A, Institute of Electrical and Electronics Engineers, New York, New York (2012).

* cited by examiner

NETWORK SWITCHING METHOD, SYSTEM, AND NETWORK SIDE DEVICE

CROSS-REFERENCE TO RELATED APPLICATION

This application is a continuation of U.S. patent application Ser. No. 14/587,134, filed on Dec. 31, 2014, which is a continuation of International Patent Application No. PCT/CN2013/070771, filed on Jan. 21, 2013, which claims priority to Chinese patent application No. 201210229729.7, filed on Jul. 4, 2012. All of the aforementioned patent applications are hereby incorporated by reference in their entireties.

TECHNICAL FIELD

The present application relates to the field of communication technology, and in particular to a network switching method and system, and a network-side device.

BACKGROUND

In a wireless communication system, content on a signaling plane, such as Identity (ID) of a cell, a broadcast signal, or paging information from a user, is often shared by users in a cell; and content on a data plane is often specified for a user. Therefore, in the wireless communication system, the demand for designing the signaling plane is different from the demand for designing the data plane.

A conventional second generation communication technology (2G) network is mainly for voice service in a continuously-covered large area, and therefore combination of the data plane and the signaling plane is used to further ensure voice continuity. For a third generation communication technology (3G) network and a future network, the demand for data transmission increases explosively, and the demand for voice service decreases, and therefore the conflicts in the tight coupling design for the data plane and the signaling plane becomes more and more outstanding. In a new network architecture, i.e., a Beyond Cellular Green (BCG) network, signaling-plane information and data-plane information are transmitted by different network devices respectively, and designs for the data plane network and for the signaling plane network are different, to maximize system capacity.

In the above-mentioned network architecture, the network switching is stilled performed according to the conventional switching method, that is, the bearer of the signaling-plane information and the bearer of the data-plane information are switched simultaneously.

SUMMARY

Network switching methods, systems and network-side devices are provided according to embodiments of the application, with which data and signaling are switched separately.

In a first aspect, a network switching method includes:
determining, by a current network-side device, that a bearer of data-plane information of a terminal device is required to be switched from the current network-side device to a destination network-side device; and
performing, by the current network-side device, a switching confirmation with the destination network-side device in a case that the current network-side device and the destination network-side device are within a coverage of a network-side device on a signaling plane, to cause the destination network-side device to enable a communication function for the data-plane information between the destination network-side device and the terminal device and complete switching the bearer of the data-plane information of the terminal device to the destination network-side device.

In conjunction with the first aspect, in a first possible implementation, in a case that each of the current network-side device and the destination network-side device is a network-side device on a data plane, performing, by the current network-side device, the switching confirmation with the destination network-side device includes:
transmitting, by the current network-side device, first switching confirmation information to a transit network-side device, where the first switching confirmation information is configured to indicate that the bearer of the data-plane information of the terminal device is required to be switched from the current network-side device to the destination network-side device, to cause the transit network-side device to enable a communication function for the data-plane information between the transit network-side device and the terminal device and complete switching the bearer of the data-plane information to the transit network-side device, the transit network-side device is a network-side device on a signaling plane that the current network-side device and the destination network-side device belong to; and
transmitting, by the transit network-side device, second switching confirmation information to the destination network-side device, where the second switching confirmation information is configured to indicate that the bearer of the data-plane information of the terminal device is required to be switched from the transit network-side device to the destination network-side device, to cause the destination network-side device to enable a communication function for the data-plane information between the destination network-side device and the terminal device and complete switching the bearer of the data-plane information to the destination network-side device.

In conjunction with the first aspect or the first possible implementation in the first aspect, in a second possible implementation, the current network-side device is a network-side device on a data plane, and the method further includes: after determining, by the current network-side device, that the bearer of the data-plane information of the terminal device is required to be switched from the current network-side device to the destination network-side device,
performing a switching confirmation with a network-side device on a signaling plane that the current network-side device belongs to in a case that the current network-side device and the destination network-side device are not within a coverage of a network-side device on a signaling plane, to cause the network-side device on the current signaling plane to enable a communication function for the data-plane information between the network-side device on the current signaling plane and the terminal device and complete switching the bearer of the data-plane information to the network-side device on the current signaling plane; and
switching, by the network-side device on the current signaling plane, data and signaling communication between the network-side device on the current signaling plane and the terminal device to be between the destination network-side device and the terminal device, in a case that the destination network-side device is a network-side device on a destination signaling plane.

In a second aspect, a network switching method for switching a bearer of data-plane information of a terminal device within a coverage of a network-side device on a signaling plane includes:

receiving, by a destination network-side device, switching confirmation information transmitted by a current network-side device, where the switching confirmation information is configured to indicate that the bearer of the data-plane information of the terminal device is required to be switched from the current network-side device to the destination network-side device; and enabling, by the destination network-side device, a communication function for the data-plane information between the destination network-side device and the terminal device and completing switching the bearer of the data-plane information of the terminal device to the destination network-side device.

In a third aspect, a network-side device includes:

a determination unit, configured to determine that a bearer of data-plane information of a terminal device is required to be switched from a current network-side device to a destination network-side device; and a switching confirmation unit, configured to perform a switching confirmation with the destination network-side device in a case that the current network-side device and the destination network-side device are within a coverage of a network-side device on a signaling plane, to cause the destination network-side device to enable a communication function for the data-plane information between the destination network-side device and the terminal device and complete switching the bearer of the data-plane information of the terminal device to the destination network-side device.

In conjunction with the third aspect, in a possible implementation, in a case that the current network-side device is a network-side device on a data plane, and the destination network-side device is a network-side device on a destination signaling plane, the switching confirmation unit is further configured to perform a switching confirmation with a network-side device on a signaling plane that the current network-side device belongs to in a case that the current network-side device and the destination network-side device are not within a coverage of a network-side device on a signaling plane, to cause the network-side device on the current signaling plane to enable a communication function for the data-plane information between the network-side device on the current signaling plane and the terminal device and complete switching the bearer of the data-plane information to the network-side device on the current signaling plane, and to cause the network-side device on the current signaling plane to switch data and signaling communication between the network-side device on the current signaling plane and the terminal device to be between the destination network-side device and the terminal device.

In a fourth aspect, a network-side device includes:

a switching confirmation receiving unit, configured to receive switching confirmation information transmitted by a current network-side device, where the switching confirmation information is configured to indicate that a bearer of data-plane information of a terminal device is required to be switched from the current network-side device to a destination network-side device; and a function enabling unit, configured to enable a communication function for the data-plane information between the network-side device and the terminal device and complete switching the bearer of the data-plane information of the terminal device to the destination network-side device.

In a fifth aspect, a network switching system for switching a bearer of data-plane information of a terminal device within a coverage of a network-side device on a signaling plane includes a current network-side device and a destination network-side device, where the current network-side device includes:

a determination unit, configured to determine that a bearer of data-plane information of a terminal device is required to be switched from a current network-side device to a destination network-side device; and a switching confirmation unit, configured to perform a switching confirmation with the destination network-side device in a case that the current network-side device and the destination network-side device are within a coverage of a network-side device on a signaling plane, to cause the destination network-side device to enable a communication function for the data-plane information between the destination network-side device and the terminal device and complete switching the bearer of the data-plane information of the terminal device to the destination network-side device;

the destination network-side device includes:

a switching confirmation receiving unit, configured to receive the switching confirmation information transmitted by the current network-side device, where the switching confirmation information is configured to indicate that the bearer of data-plane information of a terminal device is required to be switched from the current network-side device to the destination network-side device; and a function enabling unit, configured to enable a communication function for the data-plane information between the network-side device and the terminal device and complete switching the bearer of the data-plane information of the terminal device to the destination network-side device.

In a sixth aspect, a network switching system for switching a bearer of data-plane information of a terminal device within a coverage of a network-side device on a signaling plane includes a current network-side device, a transit network-side device and a destination network-side device, where each of the current network-side device and the destination network-side device is a network-side devices on a data plane, and the transit network-side device is a network-side device on a signaling plane that the current network-side device and the destination network-side device belong to; where the current network-side device is configured to determine that the bearer of the data-plane information of the terminal device is required to be switched from the current network-side device to the destination network-side device, and transmit first switching confirmation information to the transit network-side device, where the first switching confirmation information is configured to indicate that the bearer of the data-plane information of the terminal device is required to be switched from the current network-side device to the destination network-side device;

the transit network-side device is configured to receive the first switching confirmation information transmitted by the current network-side device, enable a communication function for the data-plane information between the transit network-side device and the terminal device and complete switching the bearer of the data-plane information to the transit network-side device, and transmit second switching confirmation information to the destination network-side device, where the second switching confirmation information is configured to indicate that the bearer of the data-plane information of the terminal device is required to be switched from the transit network-side device to the destination network-side device; and the destination network-side device is configured to receive the second switching confirmation information transmitted by the transit network-side device, enable a communication function for the data-plane information between the destination network-side device and the terminal device and complete switching the bearer of the data-plane information of the terminal device to the destination network-side device.

In a seventh aspect, a network switching system for switching a bearer of data-plane information of a terminal device between coverages of network-side devices on different signaling planes includes a current network-side device, a network-side device on a current signaling plane and a network-side device on a destination signaling plane, where the current network-side device bearing the data-plane information of the terminal device is a network-side device on a data plane, where the current network-side device is configured to transmit third switching confirmation information to the network-side device on a signaling plane that the current network-side device belongs to, where the third switching confirmation information is configured to indicate that the bearer of the data-plane information of the terminal device is required to be switched from the current network-side device to a destination network-side device, the destination network-side device is the network-side device on the current signaling plane; and the network-side device on the current signaling plane is configured to receive the third switching confirmation information transmitted by the current network-side device, enable a communication function for the data-plane information between the network-side device on the current signaling plane and the terminal device and complete switching the bearer of the data-plane information to the network-side device on the current signaling plane, and switch data and signaling communication between the network-side device on the current signaling plane and the terminal device to be between the network-side device on the destination signaling plane and the terminal device.

In the embodiment of the application, within a coverage of a network-side device on a signaling plane, the current network-side device bearing data-plane information of the terminal device may perform a switching confirmation with a destination network-side device in a case that the current network-side device determines that switching from the current network-side device to the destination network-side device is required, so that the destination network-side device enables a communication function for the data-plane information between the destination network-side device and the terminal device and completes switching the bearer of the data-plane information. Therefore, within a coverage of a network-side device on a signaling plane, it is allowed to switch the bearer of the data-plane information only, and thus separate switching of data and signaling is achieved. In addition, during the switching, the switching is performed between network-side devices only and thus has a small impact on the side of the terminal device.

In the embodiment, in switching the bearer of the data-plane information of the terminal device, in a case that the network-side device currently bearing the data-plane information, i.e., the current network-side device, and the destination network-side device are within coverages of network-side devices on two different signaling planes respectively, it is firstly necessary to ensure that all the data-plane information is borne by a network-side device on the current signaling plane, and then the network-side device on the current signaling plane switches the data and signaling communication between the network-side device on the current signaling plane and the terminal device to be between the network-side device on the destination signaling plane and the terminal device. Therefore, in switching the network-side devices across signaling planes, the switching of the bearer of the data-plane information and the conventional signaling switching may be combined, thereby ensuring communication continuity of a communication system in which data and signaling are separated. In addition, during the switching, the switching is performed between network-side devices only and thus has a small impact on the side of the terminal device.

BRIEF DESCRIPTION OF DRAWINGS

To describe the technical solutions of the embodiment of the application or technical solutions in conventional technology more clearly, drawings involved in the embodiments of the application or in the conventional technology are described briefly below. Apparently, the drawings described below are merely some embodiments, and persons of ordinary skill in the art can obtain other drawings according to these drawings without any creative effort.

DESCRIPTION OF EMBODIMENTS

Hereinafter, the technical solutions in the embodiments of the present application will be described clearly and completely in conjunction with the accompanying drawings in the embodiments of the present application. Apparently, the described embodiments are only a few of the embodiments of the present application. All the other embodiments obtained by those skilled in the art based on the embodiments of the present application without any creative work fall within the scope of protection of the application.

Figure 1:
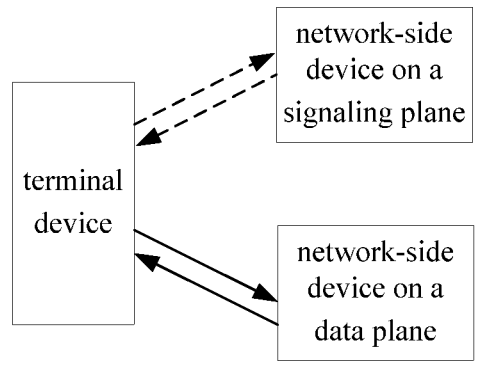
FIG. 1 is a structural schematic diagram of a communication system in which data and signaling are separated according to an embodiment of the application.

It is provided a network switching method according to an embodiment of the application, which is mainly used in a communication system in which data and signaling are separated as shown in FIG. 1, such as a BCG network. In FIG. 1, dashed arrows represent communication of signaling-plane information, and solid arrows represent communication of data-plane information. The communication system includes a network-side device on a data plane and a network-side device on a signaling plane. The network-side device on the signaling plane is a device which supports communication of signaling-plane information between the network-side device on the signaling plane and the terminal device and can process the signaling-plane information, such as a Signaling Base Station (SBS). The network-side device on the data plane is a device which supports communication of data-plane information between the network-side device on the data plane and the terminal device and can process the data-plane information, such as various data base stations (DBS), relay devices, or access points (AP).

In general, the coverage of the network-side device on the signaling plane is large. There may be many network-side devices on the data plane within the coverage of the network-side device on a signaling plane. The network-side device on the signaling plane may communicate data-plane information with a terminal device. The network-side device on the data plane may receive signaling-plane information transmitted by the terminal device, but cannot transmit signaling-plane information to the terminal device.

Figure 2:
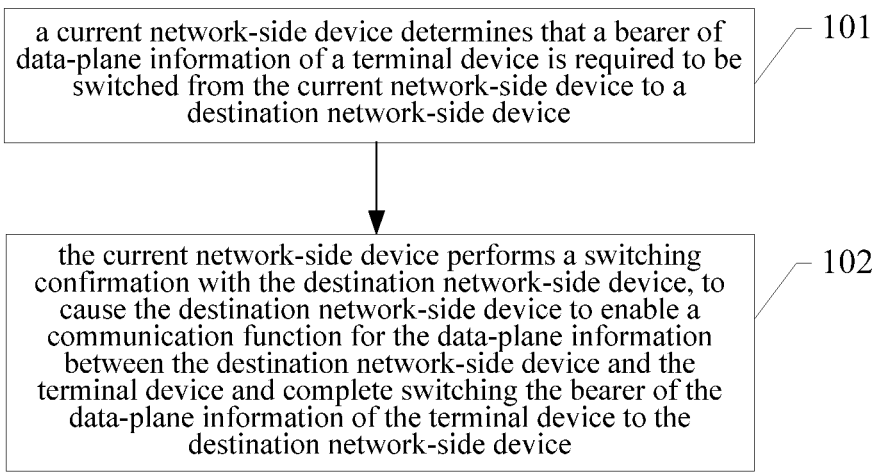
FIG. 2 is a flowchart of a network switching method performed by a current network-side device according to an embodiment of the application.

The method in this embodiment is a method for switching the bearer of the data-plane information of the terminal device between two network-side devices within a coverage of a network-side device on a signaling plane. The method in the embodiment is performed by a network-side device currently bearing the data-plane information of the terminal device (abbreviated as a current network-side device hereinafter), and the flowchart of the method is as shown in FIG. 2, which includes steps 101 to 102.

In step 101, a current network-side device determines that a bearer of data-plane information of a terminal device is required to be switched from the current network-side device to a destination network-side device.

It can be understood that, the flow in the embodiment may be initiated by the terminal device or by the network-side device. In a case that a switching condition occurs, for example, the quality of the channel currently bearing the data-plane information is poor, or the load of the network-side device exceeds a threshold, the bearer of the data-plane information of the terminal device needs to be switched from the current network-side device to the destination network-side device, to ensure the communication of the data-plane information between the current network-side device and the terminal device. The destination network-side device is determined by the network-side device according to a preset rule, such as a rule of selecting a network-side device with small loads. The specific selecting rules are not described in detail herein.

In a case that the flow in the embodiment is initiated by the terminal device, the terminal device transmits a switch request for data-plane information to the network-side device (including the above-mentioned current network-side device and other network-side device), to request switching the bearer of the data-plane information from the current network-side device to other network-side device. The switch request may include information about the terminal device. In a case that the current network-side device receives the switch request, the current network-side device makes a switching decision and determines the destination network-side device to be switched to. In a case that other network-side device receives the switch request, the other network-side device makes a switching decision and transmits a switch request including information about the destination network-side device to the current network-side device, the switch request is configured to request switching the bearer of the data-plane information of the terminal device from the current network-side device to the destination network-side device, and then the current network-side device may determine that switch to the destination network-side device is required.

In a case that the flow in the embodiment is initiated by the current network-side device, the current network-side device determines whether switch to the destination network-side device is required according to the preset switching decision rule. In a case that the flow in the embodiment is initiated by other network-side device, the other network-side device makes a switching decision, and if it is decided that switch to the destination network-side device is required, the other network-side device transmits a switch request including information about the destination network-side device to the network-side device currently bearing the data-plane information, i.e., the current network-side device. The switch request is configured to request switching the bearer of the data-plane information of the terminal device from the current network-side device to the destination network-side device. After receiving the switch request, the current network-side device determines that switch to the destination network-side device is required.

In step 102, in a case that it is determined that the current network-side device and the destination network-side device are within a coverage of a network-side device on a signaling plane, the current network-side device performs a switching confirmation with the destination network-side device, so that the destination network-side device enables a communication function for the data-plane information between the destination network-side device and the terminal device and completes switching the bearer of the data-plane information of the terminal device to the destination network-side device.

The current network-side device may transmit switching confirmation information to the destination network-side device directly. The switching confirmation information may include information about the terminal device and indication information. The indication information is configured to indicate that it is required to switch the bearer of the data-plane information of the terminal device to the destination network-side device. In this case, the destination network-side device may enable a communication function for the data-plane information between the destination network-side device and the terminal device. Specifically, the destination network-side device may enable a function of transmitting data-plane information, enable a function of receiving uplink data, and establish a data channel between the destination network-side device and the terminal device, so as to complete switching the bearer of the data-plane information to the destination network-side device. After the destination network-side device enables the communication function for the data-plane information, the above-mentioned current network-side device may disable the communication function for the data-plane information between the current network-side device and the terminal device and release related data-plane information, to save resources.

In addition, in a downlink direction, in order to ensure communication continuity between the terminal device and the network-side devices during the switching, the current network-side device, together with the destination network-side device, may transmit information to the terminal device in a manner of downlink macro diversity (such as repeated transmission), after step 102 performed by the current network-side device. Specifically, the current network-side device and the destination network-side device transmit the same information to the terminal device simultaneously, and the current network-side device does not disable the downlink transmission function between the current network-side device and the terminal device until the destination network-side device performs normal transmission of data-plane information between the destination network-side device and the terminal device, and therefore, the bearer of the data-plane information is switched. In an uplink direction of the terminal device, in order to ensure normal communication between the destination network-side device and the terminal device after the switching and ensure that the switching process is not perceived by the terminal device, the destination network-side device may obtain from the current network-side device auxiliary information for normally receiving the signal of the terminal device while enabling an uplink receiving function, the auxiliary information is, for example, a transmit frequency band or a transmission power of an uplink signal. The current network-side device deletes the necessary information for communicating the data-plane information with the terminal device after the destination network-side device receives the data-plane information normally. In this way, the bearer of the data-plane information is switched.

It should be noted that, the current network-side device may be a network-side device on a data plane, the destination network-side device is a network-side device on a signaling plane, and in this case, the current network-side device is within a coverage of the destination network-side device. Alternatively, the current network-side device is a network-side device on a signaling plane, the destination network-side device is a network-side device on a data plane, and in this case, the destination network-side device is within a coverage of the current network-side device. Alternatively, the current network-side device is a network-side device on a data plane, the destination network-side device is a network-side device on a data plane, and in this case, the current network-side device and the destination network-side device are within a coverage of a network-side device on a signaling plane.

As can be seen, in the embodiment of the application, within a coverage of a network-side device on a signaling plane, the current network-side device bearing data-plane information of the terminal device may perform a switching confirmation with a destination network-side device in a case that the current network-side device determines that switching from the current network-side device to the destination network-side device is required, so that the destination network-side device enables a communication function for the data-plane information between the destination network-side device and the terminal device and completes switching the bearer of the data-plane information. Therefore, within a coverage of a network-side device on a signaling plane, it is allowed to switch the bearer of the data-plane information only, and thus separate switching of data and signaling is achieved. In addition, during the switching, the switching is performed between network-side devices only and thus has a small impact on the side of the terminal device.

In an embodiment, in a case that each of the current network-side device and the destination network-side device is a network-side device on a data plane, the current network-side device may perform the switching confirmation with the destination network-side device by means of a transit network-side device in performing step 102. Specifically, the current network-side device may transmit first switching confirmation information to the transit network-side device. The first switching confirmation information is configured to indicate that the bearer of the data-plane information of the terminal device is required to be switched from the current network-side device to the destination network-side device. In this case, the transit network-side device enables a communication function for the data-plane information between the transit network-side device and the terminal device and completes switching the bearer of the data-plane information to the transit network-side device. The transit network-side device may be a network-side device on a signaling plane that the current network-side device and the destination network-side device belong to. The transit network-side device then transmits second switching confirmation information to the destination network-side device. The second switching confirmation information is configured to indicate that the bearer of the data-plane information of the terminal device is required to be switched from the transit network-side device to the destination network-side device. In this case, the destination network-side device enables a communication function for the data-plane information between the destination network-side device and the terminal device and completes switching the bearer of the data-plane information to the destination network-side device.

In this case, the current state of the network-side device on the destination data plane can be considered. For example, the power of the network-side device on the destination data plane is asynchronized with the power of the terminal device so that the network-side device on the destination data plane can not communicate with the terminal device directly, or the network-side device on the destination data plane is in a sleep state. The network-side devices on two data planes may not communicate with the terminal device normally after being switched directly, and therefore a transit switch by a network-side device on a signaling plane is needed. The bearer of the data-plane information is firstly switched to the transit network-side device, and once the transit network-side device determines that the destination network-side device needs to be configured, the transit network-side device may transmit configuration signaling to the destination network-side device to configure the destination network-side device, so that the destination network-side device may communicate with the terminal device normally. For example, the destination network-side device may be awakened, or the power of the destination network-side device may be synchronized with the power of the terminal device. Therefore, it is ensured the normal communication between the destination network-side device and the terminal device after the bearer of the data-plane information is switched between the network-side devices on two data planes.

Figure 3:
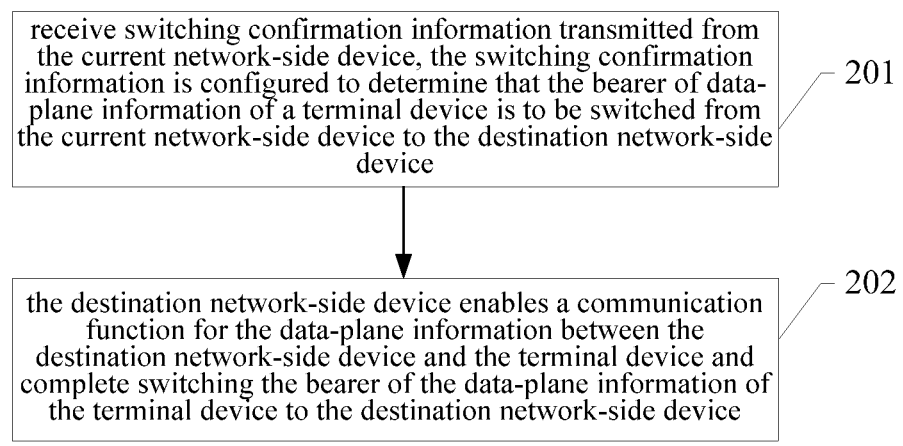
FIG. 3 is a flowchart of a network switching method performed by a destination network-side device according to an embodiment of the application.

It is provided another network switching method according to an embodiment of the application, which is mainly used in the communication system as shown in FIG. 1. The method in this embodiment is a method for switching a bearer of data-plane information of a terminal device between two network-side devices within a coverage of a network-side device on a signaling plane. The method in the embodiment is performed by a network-side device to be bearing the data-plane information of the terminal device, i.e., the destination network-side device in the embodiment as shown in FIG. 2, and the flowchart of the method is as shown in FIG. 3, which includes steps 201 to 202.

In step 201, the destination network-side device receives switching confirmation information transmitted by the current network-side device. The switching confirmation information is configured to indicate that the bearer of the data-plane information of the terminal device is required to be switched from the current network-side device to the destination network-side device.

It can be understood that, the flow in the embodiment may be initiated by the terminal device or by the network-side device, and the specific initiating process is described in the embodiment shown in FIG. 1, which is not described in detail herein. In a case that the network-side device currently bearing the data-plane information of the terminal device, i.e., the current network-side device, determines that switch from the current network-side device to the destination network-side device is required, the current network-side device performs a switching confirmation with the destination network-side device, specifically, transmits switching confirmation information to the destination network-side device.

In step 202, the destination network-side device enables a communication function for the data-plane information between the destination network-side device and the terminal device and completes switching the bearer of the data-plane information of the terminal device to the destination network-side device.

Specifically, the destination network-side device may enable a function of transmitting data-plane information, and together with the current network-side device, transmit information to the terminal device in a manner of downlink macro diversity; and the destination network-side device may enable a function of receiving uplink data, and obtain from the current network-side device auxiliary information for normally communicating with the terminal device, the auxiliary information is, for example, a transmit frequency band or a transmission power of an uplink signal. Therefore, a data channel between the destination network-side device and the terminal device may be established and a normal communication between the destination network-side device and the terminal device may be performed, and thus the bearer of the data-plane information is switched from the current network-side device to the destination network-side device.

In the embodiment, the current network-side device and the destination network-side device are within a coverage of a network-side device on a signaling plane. The current network-side device may be a network-side device on a data plane, the destination network-side device is a network-side device on a signaling plane, and in this case, the current network-side device is within a coverage of the destination network-side device. Alternatively, the current network-side device is a network-side device on a signaling plane, the destination network-side device is a network-side device on a data plane, and in this case, the destination network-side device is within a coverage of the current network-side device. Alternatively, the current network-side device is a network-side device on a data plane, the destination network-side device is a network-side device on a data plane, and in this case, the current network-side device and the destination network-side device are within a coverage of a network-side device on a signaling plane.

As can be seen, in the embodiment of the application, within a coverage of a network-side device on a signaling plane, in a case that the destination network-side device receives switching confirmation information transmitted by the network-side device currently bearing the data-plane information of the terminal device, i.e., the current network-side device, and the switching confirmation information indicates that switch from the current network-side device to the destination network-side device is required, the destination network-side device enables a communication function for the data-plane information between the destination network-side device and the terminal device and completes switching the bearer of the data-plane information to the destination network-side device. Therefore, within a coverage of a network-side device on a signaling plane, it is allowed to switch the bearer of the data-plane information only, and thus separate switching of data and signaling is achieved. In addition, during the switching, the switching is performed between network-side devices only and thus has a small impact on the side of the terminal device.

Figure 4:
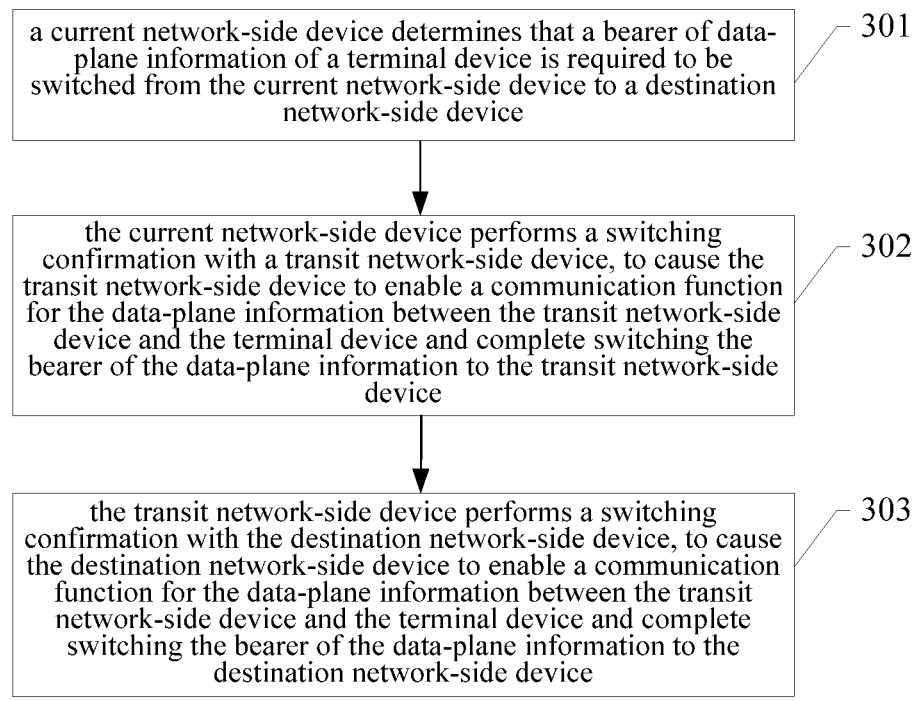
FIG. 4 is a flowchart of another network switching method according to an embodiment of the application.

It is provided another network switching method according to an embodiment of the application, which is mainly used in the communication system as shown in FIG. 1. The method in this embodiment is a method for switching a bearer of data-plane information of a terminal device between network-side devices on two data planes within a coverage of a network-side device on a signaling plane, and the flowchart of the method is as shown in FIG. 4, which includes steps 301 to 303.

In step 301, a current network-side device determines that a bear of data-plane information of a terminal device is required to be switched from the current network-side device to a destination network-side device. In this embodiment, each of the current network-side device and the destination network-side device is a network-side device on a data plane.

It can be understood that, the flow in the embodiment may be initiated by the terminal device or by the network-side device, and the specific initiating process is described in the embodiment as shown in FIG. 1, which is not described in detail herein. The switching is decided by the network-side device (including the current network-side device).

In step 302, in a case that it is determined that the current network-side device and the destination network-side device are within a coverage of a network-side device on a signaling plane, the current network-side device performs a switching confirmation with a transit network-side device. Specifically, the current network-side device may transmit first switching confirmation information to the transit network-side device, and the first switching confirmation information is configured to indicate to switch the bearer of the data-plane information from the current network-side device to the destination network-side device.

In the embodiment, the transit network-side device is a network-side device on a signaling plane that the current network-side device and the destination network-side device belong to. Upon receipt of the first switching confirmation information, the transit network-side device may enable a communication function for the data-plane information between the transit network-side device and the terminal device and complete switching the bearer of the data-plane information from the current network-side device to the transit network-side device. The specific switching process is described in the embodiment of the method as shown in FIG. 2, which is not described in detail herein. However, since the switching confirmation information received by the transit network-side device indicates to switch to the destination network-side device, the transit network-side device further performs a switching confirmation with the destination network-side device, that is, transmits second switching confirmation information to the destination network-side device. The second switching confirmation information is configured to indicate to switch the bearer of the data-plane information from the transit network-side device to the destination network-side device.

In step 303, the transit network-side device performs a switching confirmation with the destination network-side device, so that the destination network-side device enables a communication function for the data-plane information between the destination network-side device and the terminal device and complete switching the bearer of the data-plane information from the transit network-side device to the destination network-side device.

It should be noted that, after switching the bearer of the data-plane information from the current network-side device to the destination network-side device, the current network-side device and the transit network-side device may respectively disable the communication functions for the data-plane information between the current network-side device and the terminal device and between the transit network-side device and the terminal device, and release related data-plane information. Each of the current network-side device and the destination network-side device is a network-side device on a data plane, and the transit network-side device is a network-side device on a signaling plane that the current network-side device and the destination network-side device belong to.

In addition, after performing step 302, the transit network-side device may determine whether the destination network-side device needs to be configured. Once a condition such as the power of the destination network-side device being asynchronized with the power of the terminal device or the destination network-side device being in a sleep state occurs, the transit network-side device may transmit configuration signaling to the destination network-side device to configure the destination network-side device, so that the destination network-side device can communicate with the terminal device normally, for example, the destination network-side device may be awakened, or the power of the destination network-side device is synchronized with the power of the terminal device. The step for configuring the destination network-side device and the above-mentioned step 303 may be performed simultaneously or sequentially.

As can be seen, in the embodiment, within a coverage of a network-side device on a signaling plane, in switching the bearer of the data-plane information between the network-side devices on two data planes, the bearer of the data-plane information may be switched from the network-side device on the current data plane to a network-side device on a signaling plane, and then be switched from the network-side device on the signaling plane to the network-side device on the destination data plane. Therefore, the bearer of the data-plane information is switched from the network-side device on one data plane to the network-side device on another data plane by means of transit of the network-side device on the signaling plane.

Figure 5:
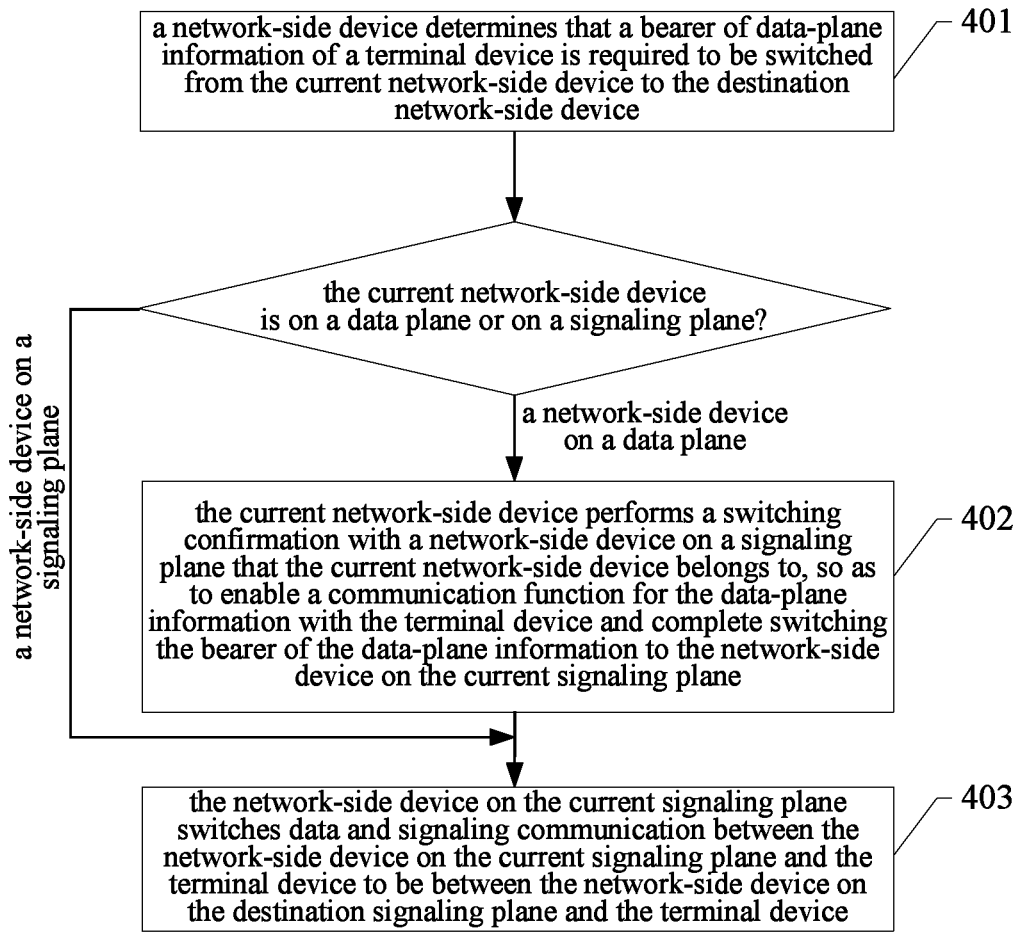
FIG. 5 is a flowchart of another network switching method according to an embodiment of the application.

It is provided another network switching method according to an embodiment of the application, which is mainly used in the communication system as shown in FIG. 1. The method in this embodiment is a method for switching a bearer of data-plane information of a terminal device in a case that the network-side device currently bearing the data-plane information, i.e., the current network-side device, and the destination network-side device are respectively within coverages of network-side devices on two different signaling planes, and the flowchart of the method is as shown in FIG. 5, which includes steps 401 to 403.

In step 401, a network-side device determines that a bear of data-plane information of a terminal device is required to be switched from the current network-side device to the destination network-side device. Step 402 and step 403 are performed in a case that the current network-side device is a network-side device on a data plane, the current network-side device and the destination network-side device are not within a coverage of a network-side device on a signaling plane, and the destination network-side device is a network-side device on a destination signaling plane. Step 403 is performed in a case that the current network-side device is a network-side device on a signaling plane, the current network-side device and the destination network-side device are not within a coverage of a network-side device on a signaling plane, and the destination network-side device is a network-side device on a destination signaling plane.

It can be understood that, the switching flow in the embodiment may be initiated by the terminal device or by the network-side device. In a case that the switching flow is initiated by the terminal device and a switching condition such as the signal quality of the data-plane information received by the terminal device being poor occurs, the terminal device may transmit a switch request for the data-plane information to the network-side device (including the current network-side device), to request switching the bearer of the data-plane information from the current network-side device to other network-side device. After receiving the switch request, the network-side device makes a switching decision, for example, decides the destination network-side device to be switched to. In a case that the switching flow is initiated by the network-side device and a switching condition such as the load exceeding a preset value occurs, the network-side device makes a switching decision, to decide the destination network-side device to be switched to.

In step 402, the current network-side device performs a switching confirmation with the network-side device on the signaling plane that the current network-side device belongs to. Specifically, the current network-side device transmits switching confirmation information to the network-side device on the current signaling plane, to indicate that the bearer of the data-plane information is required to be switched to the network-side device on the current signaling plane. In this case, the network-side device on the current signaling plane enables a communication function for the data-plane information between the network-side device on the current signaling plane and the terminal device and complete switching the bearer of the data-plane information from the current network-side device to the network-side device on the current signaling plane. The specific switching process is described in the embodiment of the method as shown in FIG. 2, which is not described in detail herein.

In step 403, the network-side device on the current signaling plane switches the data and signaling communication between the network-side device on the current signaling plane and the terminal device to be between the destination network-side device and the terminal device in a conventional switching manner. The destination network-side device is a network-side device on the destination signaling plane. Specifically, the network-side device on the current signaling plane transmits a switch request to the network-side device on the destination signaling plane, to request switching data and signaling communication between the network-side device on the current signaling plane and the terminal device to be between the network-side device on the destination signaling plane and the terminal device. After receiving the switch request, the network-side device on the destination signaling plane establishes a channel between the network-side device on the destination signaling plane and the terminal device for communicating the data-plane information and the signaling-plane information.

In addition, after step 403, in a case that the destination network-side device is a network-side device on a destination data plane within a coverage of a network-side device on a destination signaling plane, it may be considered that the load is small and the transmission power is large for the network-side device on the data plane within the coverage of the network-side device on the destination signaling plane. In order to ensure the communication of the data-plane information between the network-side device and the terminal device, the network-side device on the destination signaling plane may perform a switching confirmation with the network-side device on the destination data plane, so that the network-side device on the destination data plane enables a communication function for the data-plane information between the network-side device on the destination data plane and the terminal device and complete switching the bearer of the data-plane information from the network-side device on the destination signaling plane to the network-side device on the destination data plane.

As can be seen, in the embodiment, in switching the bearer of the data-plane information of the terminal device, in a case that the network-side device currently bearing the data-plane information, i.e., the current network-side device, and the destination network-side device are within coverages of network-side devices on two different signaling planes respectively, it is necessary to ensure that all the data-plane information is borne by the network-side device on the current signaling plane, and then the network-side device on the current signaling plane switches data and signaling communication between the network-side device on the current signaling plane and the terminal device to be between the network-side device on the destination signaling plane and the terminal device. Therefore, in switching between the network-side devices across signaling planes, the switching of the bearer of the data-plane information and the conventional signaling switching may be combined, thereby ensuring communication continuity of the communication system in which data and signaling are separated as shown in FIG. 1. In addition, during the switching, the switching is performed between network-side devices only and thus has a small impact on the side of the terminal device.

It should be noted that, in the embodiments as shown in FIG. 2 to FIG. 5, besides performing the above network switching flow, the network-side device for bearing the signaling-plane information of the terminal device may further perform the following step A and step B.

In step A, the network-side device on a signaling plane transmits first instruction information to the terminal device, to instruct the terminal device to communicate signaling-plane information with the network-side device on the signaling plane by using a first frequency band and communicate data-plane information with the network-side device on the signaling plane by using a second frequency band.

In general, a large coverage should be ensured for the signaling-plane information, and a large throughput should be ensured for the data-plane information. For the common wireless cellular spectrum, the first frequency band, i.e., a low frequency band which is lower than a preset frequency band A1 (such as spectrum of 800 MHz to 900 MHz), can ensure the integrity and continuity of the coverage, and the second frequency band, i.e., a high frequency band which is higher than a preset frequency band A2 (such as spectrum of 2.1 GHz, 2.6 GHz), ensures the larger throughput. Therefore, the first frequency band may be used for communication of the signaling-plane information, and the second frequency band may be used for communication of the data-plane information.

In step B, the network-side device on a signaling plane transmits second instruction information to the terminal device, to instruct the terminal device to use coupling transmission for data-plane information and signaling-plane information in the uplink transmission and use split transmission for data-plane information and signaling-plane information in the downlink transmission.

According to features of the uplink transmission and the downlink transmission of the terminal device, in the embodiment, in a downlink direction, the split transmission for data-plane information and signaling-plane information is used, that is, the network-side device on the data plane communicates the data-plane information with the terminal device and the network-side device on the signaling plane communicates the signaling-plane information with the terminal device, to ensure the rate of information transmission and improve the throughput of the system. In an uplink direction of the terminal device, tight coupling for data-plane information and signaling-plane information is used, that is, all the data-plane information and the signaling-plane information is sent to a network-side device on a data plane or a signaling plane, in this way, there is less demand on the terminal device and resource utilization of the system can be improved.

In addition, it should be noted that, the above network switching methods may be applied to a wireless communication system with any standard/encoding mode/modulation mode, and the above network-side devices may be various network devices supporting data and signaling separation, such as a base station, a relay device or a wireless access point.

Figure 6:
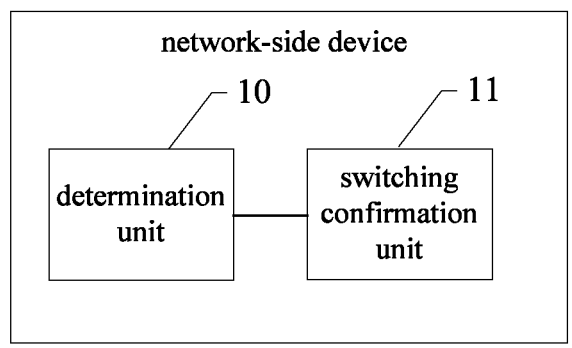
FIG. 6 is a structural schematic diagram of a network-side device according to an embodiment of the application.

It is further provided a network-side device, i.e., the above-mentioned current network-side device, according to an embodiment of the application, which may be a device supporting data and signaling separation, such as a base station, a relay device or a wireless access point, the structural schematic diagram of the network-side device is as shown in FIG. 6, which includes a determination unit 10 and a switching confirmation unit 11.

The determination unit 10 is configured to determine that a bearer of data-plane information of a terminal device is required to be switched from a current network-side device to a destination network-side device. Specifically, the determination unit 10 may actively initiate a switching flow, make a switching decision and determine the destination network-side device. Alternatively, the determination unit 10 may passively receive a switch request including the destination network-side device which is transmitted by other network-side device after the other network-side device makes a switching decision. The switch request is configured to request switching the bearer of the data-plane information from the current network-side device to the destination network-side device.

The switching confirmation unit 11 is configured to perform a switching confirmation with the destination network-side device determined by the determination unit 10 in a case that the current network-side device and the destination network-side device are within a coverage of a network-side device on a signaling plane, to cause the destination network-side device to enable a communication function for the data-plane information between the destination network-side device and the terminal device and complete switching the bearer of the data-plane information to the destination network-side device.

It should be noted that, the current network-side device may be a network-side device on a data plane, the destination network-side device is a network-side device on a signaling plane, and in this case, the current network-side device is within a coverage of the destination network-side device. Alternatively, the current network-side device is a network-side device on a signaling plane, the destination network-side device is a network-side device on a data plane, and in this case, the destination network-side device is within a coverage of the current network-side device. Alternatively, the current network-side device is a network-side device on a data plane, the destination network-side device is a network-side device on a data plane, and in this case, the current network-side device and the destination network-side device are within a coverage of a network-side device on a signaling plane.

In a case that the current network-side device is a network-side device on a data plane, and the destination network-side device is a network-side device on a destination signaling plane, the switching confirmation unit 11 is further configured to perform a switching confirmation with a network-side device on a signaling plane that the current network-side device belongs to in a case that the current network-side device and the destination network-side device are not within a coverage of a network-side device on a signaling plane, to cause the network-side device on the current signaling plane to enable a communication function for the data-plane information between the network-side device on the current signaling plane and the terminal device and complete switching the bearer of the data-plane information to the network-side device on the current signaling plane, and the network-side device on the current signaling plane then switches data and signaling communication between the network-side device on the current signaling plane and the terminal device to be between the destination network-side device and the terminal device.

As can be seen, in the embodiment, within a coverage of a network-side device on a signaling plane, in the current network-side device bearing the data-plane information of the terminal device, in a case that the determination unit 10 determines that switch from the current network-side device to the destination network-side device is required, the switching confirmation unit 11 may perform a switching confirmation with the destination network-side device, so that the destination network-side device enables a communication function for the data-plane information between the destination network-side device and the terminal device and complete switching the bearer of the data-plane information. Therefore, within a coverage of a network-side device on a signaling plane, it is allowed to switch the bearer of the data-plane information only, and thus separate switching of data and signaling is achieved. In addition, during the switching, the switching is performed between network-side devices only and thus has a small impact on the side of the terminal device.

Figure 7:
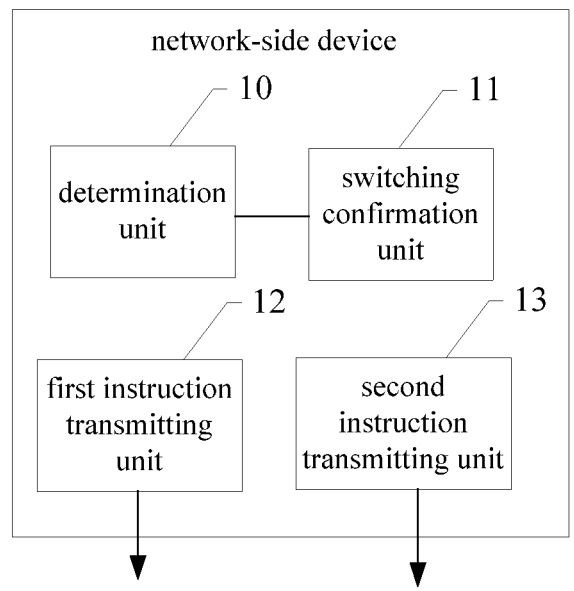
FIG. 7 is a structural schematic diagram of another network-side device according to an embodiment of the application.

Furthermore, referring to FIG. 7, in a case that the current network-side device, i.e., the network-side device in the embodiment, is a network-side device on a signaling plane, the network-side device in the embodiment, besides including the structure as shown in FIG. 6, may further include a first instruction transmitting unit 12 and a second instruction transmitting unit 13. The first instruction transmitting unit 12 is configured to transmit first instruction information to the terminal device, to instruct the terminal device to communicate signaling-plane information with the current network-side device by using a first frequency band and communicate data-plane information with the current network-side device by using a second frequency band. The second instruction transmitting unit 13 is configured to transmit second instruction information to the terminal device, to instruct the terminal device to use coupling transmission for data-plane information and signaling-plane information in uplink transmission and use split transmission for data-plane information and signaling-plane information in downlink transmission.

In one embodiment, in order to save resource, the network-side device may further include a post-switching processing unit, configured to disable the communication function for the data-plane information between the network-side device and the terminal device and release related data-plane information after switching. In order to ensure communication continuity between the terminal device and the network-side device during the switching, the network-side device may further include an in-switching processing unit, configured to transmit information to the terminal device in a manner of downlink macro diversity together with the destination network-side device, after the switching confirmation is performed by the switching confirmation unit 11.

Figure 8:
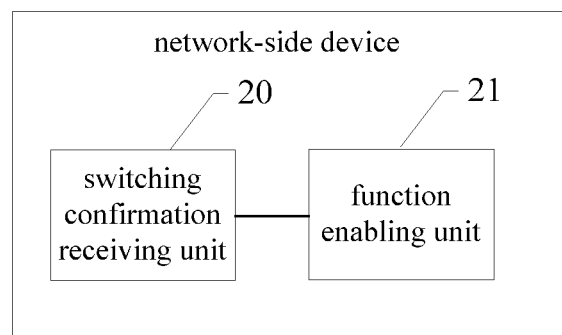
FIG. 8 is a structural schematic diagram of another network-side device according to an embodiment of the application.

It is further provided a network-side device, i.e., the above-mentioned destination network-side device, according to an embodiment of the application, which may be a device supporting data and signaling separation, such as a base station, a relay device or a wireless access point, and the structural schematic diagram of the network-side device is as shown in FIG. 8, which includes a switching confirmation receiving unit 20 and a function enabling unit 21.

The switching confirmation receiving unit 20 is configured to receive switching confirmation information transmitted by a current network-side device, where the switching confirmation information is configured to indicate that a bearer of data-plane information of a terminal device is required to be switched from the current network-side device to the destination network-side device.

The function enabling unit 21 is configured to enable a communication function for the data-plane information with the terminal device and complete switching the bearer of the data-plane information of the terminal device to the destination network-side device according to the switching confirmation information received by the switching confirmation receiving unit 20. Specifically, the function enabling unit 21 may enable a function of transmitting data-plane information and send information to the terminal device in a manner of downlink macro diversity together with the current network-side device. The function enabling unit 21 may enable a function of receiving uplink data and obtain from the current network-side device auxiliary information for normally communicating with the terminal device, the auxiliary information is, for example, a transmit frequency band or a transmission power of an uplink signal. Therefore, a data channel between the destination network-side device and the terminal device may be established and normal communication between the destination network-side device and the terminal device may be performed. Therefore, the bearer of the data-plane information is switched from the current network-side device to the destination network-side device. The current network-side device and the destination network-side device are within a coverage of a network-side device on a signaling plane.

In an embodiment of the application, within a coverage of a network-side device on a signaling plane, in a case that the switching confirmation receiving unit 20 in the destination network-side device receives a switching confirmation transmitted from the network-side device currently bearing the data-plane information of the terminal device, i.e., the current network-side device, and the switching confirmation indicates that switch from the current network-side device to the destination network-side device is required, the function enabling unit 21 enables a function of communicating the data-plane information with the terminal device and completes switching the bearer of the data-plane information. Therefore, within a coverage of a network-side device on a signaling plane, it is allowed to switch the bearer of the data-plane information only, and thus separate switching of data and signaling is achieved. In addition, during the switching, the switching is performed between network-side devices only and thus has a small impact on the side of the terminal device.

Figure 9:
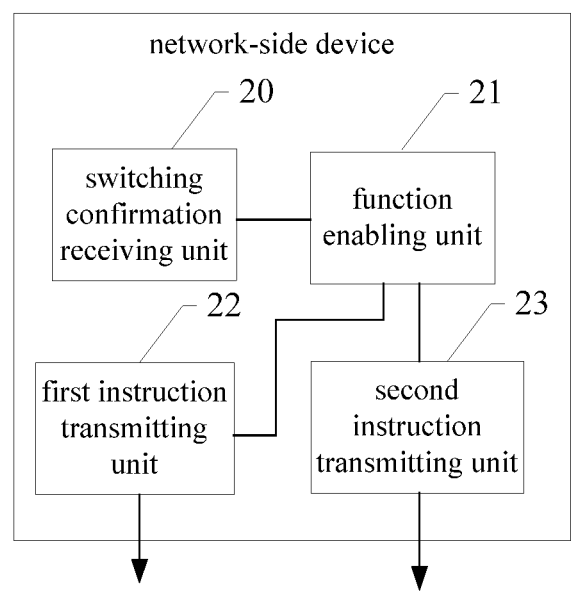
FIG. 9 is a structural schematic diagram of another network-side device according to an embodiment of the application.

Furthermore, referring to FIG. 9, in a case that the destination network-side device, i.e., the network-side device in the embodiment, is a network-side device on a signaling plane, the network-side device in the embodiment, besides including the structure as shown in FIG. 8, may further include a first instruction transmitting unit 22 and a second instruction transmitting unit 23. The first instruction transmitting unit 22 is configured to transmit first instruction information to the terminal device after the function enabling unit 21 enables the data communication function and achieves the switching, to instruct the terminal device to communicate signaling-plane information with the destination network-side device by using a first frequency band and communicate data-plane information with the destination network-side device by using a second frequency band. The second instruction transmitting unit 23 is configured to transmit second instruction information to the terminal device after the function enabling unit 21 enables the data communication function and achieves the switching, to instruct the terminal device to use coupling transmission for data-plane information and signaling-plane information in uplink transmission and use split transmission for data-plane information and signaling-plane information in downlink transmission.

It is further provided a network switching system according to an embodiment of the application, which includes a current network-side device and a destination network-side device. The structure of the current network-side device is as shown in FIG. 6 and the destination network-side device is as shown in FIG. 8. In a case that the current network-side device is a network-side device on a signaling data, the structure of the current network-side device may be as shown in FIG. 7; and in a case that the destination network-side device is a network-side device on a signaling plane, the structure of the destination network-side device may be as shown in FIG. 9, the detailed description thereof is omitted herein. With the system according to the embodiment, switch of the bearer of data-plane information between two network-side devices within a coverage of a network-side device on a signaling plane can be achieved.

Figure 10:
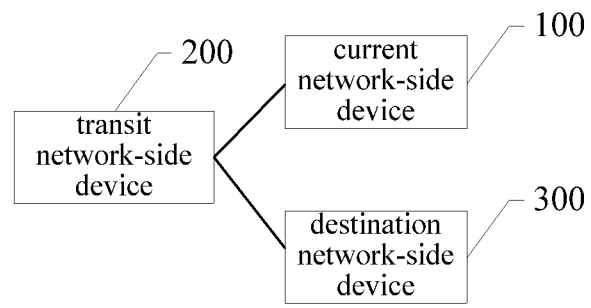
FIG. 10 is a structural schematic diagram of a network switching system according to an embodiment of the application.

Referring to FIG. 10, it is further provided a network switching system according to an embodiment of the application, which includes a current network-side device 100, a transit network-side device 200 and a destination network-side device 300. Each of the current network-side device and the destination network-side device is a network-side device on a data plane, and the transit network-side device is a network-side device on a signaling plane that the current network-side device and the destination network-side device belong to. With the system according to the embodiment, switch of the bearer of data-plane information between network-side devices on two data planes within a coverage of a network-side device on a signaling plane can be achieved.

The current network-side device 100 is configured to determine that the bearer of the data-plane information of the terminal device is required to be switched from the current network-side device to the destination network-side device, and perform a switching confirmation with the transit network-side device, specifically, transmit first switching confirmation information to the transit network-side device 200. The first switching confirmation information is configured to indicate switching the bearer of the data-plane information from the current network-side device 100 to the destination network-side device 300.

The transit network-side device 200 is configured to receive the first switching confirmation information transmitted by the current network-side device, enables a communication function for the data-plane information between the transit network-side device and the terminal device and complete switching the bearer of the data-plane information to the transit network-side device 200; and perform a switching confirmation with the destination network-side device 300, specifically, transmit second switching confirmation information to the destination network-side device 300. The second switching confirmation information is configured to indicate switching the bearer of the data-plane information from the transit network-side device 200 to the destination network-side device 300.

The destination network-side device 300 is configured to receive the second switching confirmation information transmitted by the transit network-side device, enable a communication function for the data-plane information between the destination network-side device and the terminal device and complete switching the bearer of the data-plane information of the terminal device to the destination network-side device 300. The structure of the current network-side device 100 may be as shown in FIG. 6 and the structure of the destination network-side device 200 may be as shown in FIG. 8. The transit network-side device 200, besides including the structure as shown in FIG. 8 or FIG. 9, may further include a unit for transmitting a switching confirmation to the destination network-side device 300.

Figure 11:
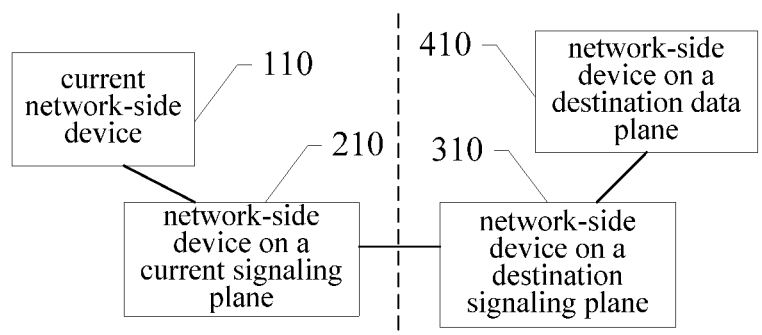
FIG. 11 is a structural schematic diagram of another network switching system according to an embodiment of the application.

Referring to FIG. 11, it is further provided a network switching system according to an embodiment of the application, which includes a current network-side device 110, a network-side device on a current signaling plane 210 and a network-side device on a destination signaling plane 310. The current network-side device 110 is a network-side device on a data plane. With the system according to the embodiment, switch of the bearer of data-plane information between coverages of network-side devices on two different signaling planes can be achieved.

The current network-side device 110 is configured to perform a switching confirmation with a network-side device on a signaling plane that the current network-side device belongs to, specifically, transmit third switching confirmation information to the network-side device on the current signaling plane 210. The third switching confirmation information is configured to indicate switching the bearer of the data-plane information from the current network-side device 110 to the destination network-side device. The destination network-side device is the network-side device on the destination signaling plane 310. The network-side device on the current signaling plane 210 is configured to receive the third switching confirmation information transmitted by the current network-side device, enable a communication function for the data-plane information between the network-side device on the current signaling plane 210 and the terminal device and complete switching the bearer of the data-plane information to the network-side device on the current signaling plane 210, and switch data and signaling communication between the network-side device on the current signaling plane 210 and the terminal device to be between the network-side device on the destination signaling plane and the terminal device by using a conventional switching mode.

In the embodiment, in a case that the network-side device currently bearing the data-plane information is the network-side device on the current signaling plane 210, the network-side device on the current signaling plane 210 may perform the switching by using a signaling switching mode directly.

Furthermore, in a case that the destination network-side device is a network-side device on a destination data plane 410 within a coverage of a network-side device on the current signaling plane, the system according to the embodiment may further include the network-side device on the destination data plane 410. In this case, the network-side device on the destination signaling plane 310 may further be configured to perform a switching confirmation with the network-side device on the destination data plane 410, specifically, transmit fourth switching confirmation information to the network-side device on the destination data plane. The fourth switching confirmation information is configured to indicate switching the bearer of the data-plane information from the network-side device on the destination signaling plane 310 to the network-side device on the destination data plane 410. The network-side device on the destination data plane 410 is configured to receive the fourth switching confirmation information transmitted by the network-side device on the destination signaling plane, enable a communication function for the data-plane information between the network-side device on the destination data plane 410 and the terminal device and complete switching the bearer of the data-plane information to the network-side device on the destination data plane 410.

The structure of the current network-side device 110 may be as shown in FIG. 6 and the structure of the network-side device on the destination data plane 410 may be as shown in FIG. 8. The network-side device on the current signaling plane 210, besides including the structure as shown in FIG. 8 or FIG. 9, may further include a unit for switching data together with signaling. The network-side device on the destination signaling plane 310, besides including the structure as shown in FIG. 6 or FIG. 7, may further include a unit for switching data together with signaling.

It can be understood by those skilled in the art that the all or part of steps in various methods provided by the embodiments described above may be accomplished by means of related hardware instructed by programs, where the programs may be stored in a computer readable storage medium. The storage medium may be ROM, RAM, magnetic disk, optical disk, etc.

In the above, the operation process method, system and device provided by the embodiments of the application are described in details. Specific examples are used to set forth the principle and embodiments of the application. The above-mentioned embodiments are illustrated to facilitate the understanding of the methods of the application and core concept thereof. Meanwhile, those skilled in the art can make some changes in the specific implementations and the field of application in accordance with the concept of the application. Above all, this specification should not be considered to limit the application.

What is claimed is:

1. A network switching method for switching a bearer of data-plane information for a terminal device within a coverage of a network-side device on a signaling plane, comprising:
   determining, by a first network-side device, that a bearer of data-plane information for the terminal device is to be switched from the first network-side device to a second network-side device; and
   transmitting, by the first network-side device, switching confirmation information to the second network-side device, wherein the switching confirmation information indicates that the bearer of the data-plane information for the terminal device is required to be switched from the first network-side device to the second network-side device, which causes enabling a communication function for the data-plane information between the second network-side device and the terminal device, and completing a switching of the bearer of the data-plane information of the terminal device to the second network-side device,
   wherein the first network-side device is on a data plane, the second network-side device is on the signaling plane, and the first network-side device is within a coverage of the second network-side device.

2. The method according to claim 1,
   wherein after the communication function is enabled, first instruction information is transmitted by the second network-side device to the terminal device, to instruct the terminal device to communicate signaling-plane information with the second network-side device using a first frequency band and to communicate data-plane information with the second network-side device using a second frequency band.

3. A non-transitory, processor-readable medium having processor-executable instructions stored thereon for a network switching method, the processor-executable instructions, when executed by a processor, being configured to facilitate the following steps:
   determining, by a first network-side device, that a bearer of data-plane information for the terminal device is to be switched from the first network-side device to a second network-side device; and
   transmitting, by the first network-side device, switching confirmation information to the second network-side device, wherein the switching confirmation information indicates that the bearer of the data-plane information for the terminal device is required to be switched from the first network-side device to the second network-side device, which causes enabling a communication function for the data-plane information between the second network-side device and the terminal device, and completing a switching of the bearer of the data-plane information of the terminal device to the second network-side device,
   wherein the first network-side device is on a data plane, the second network-side device is on the signaling plane, and the first network-side device is within a coverage of the second network-side device.

4. The non-transitory, processor-readable medium according to claim 3,
   wherein after the communication function is enabled, first instruction information is transmitted by the second network-side device to the terminal device, to instruct the terminal device to communicate signaling-plane information with the second network-side device using a first frequency band and to communicate data-plane information with the second network-side device using a second frequency band.

\* \* \* \* \*